United States Patent
Majumdar et al.

[19]

[11] Patent Number: 5,951,797
[45] Date of Patent: Sep. 14, 1999

[54] CURABLE FILLED TREAD ADHESIVE FOR TIRES AS DISCRETE PORTIONS ON A RELEASE BACKING

[75] Inventors: Ramendra Nath Majumdar, Hudson, Ohio; Larry Lee Mershon, Ridgeley, W. Va.; James Michael Hart, Akron, Ohio

[73] Assignee: The Goodyear Tire & Rubber Company, Akron, Ohio

[21] Appl. No.: 08/820,742

[22] Filed: Mar. 19, 1997

[51] Int. Cl.⁶ .................................................. B29D 30/52
[52] U.S. Cl. ...................... 156/96; 156/110.1; 156/128.6; 156/238; 156/291; 428/198
[58] Field of Search ..................... 156/96, 110.1, 156/128.1, 128.6, 129, 130, 291, 344, 238, 234, 235; 428/198

[56] References Cited

U.S. PATENT DOCUMENTS

| | | | |
|---|---|---|---|
| 2,466,911 | 4/1949 | Raymond | 428/198 |
| 3,671,284 | 6/1972 | Uhrig | 428/198 |
| 3,741,786 | 6/1973 | Torrey | 156/344 |
| 4,046,947 | 9/1977 | Brodie . | |
| 4,281,703 | 8/1981 | Ahmad . | |
| 4,325,770 | 4/1982 | Korpman . | |
| 4,463,120 | 7/1984 | Collins et al. . | |
| 4,497,927 | 2/1985 | Tai et al. . | |
| 4,539,365 | 9/1985 | Rhee . | |
| 4,635,693 | 1/1987 | Ahagon et al. . | |
| 4,647,328 | 3/1987 | Rhee . | |
| 4,683,152 | 7/1987 | Moran et al. . | |
| 4,808,657 | 2/1989 | Brown . | |
| 5,104,476 | 4/1992 | Yamada et al. . | |
| 5,275,855 | 1/1994 | Kobayashi et al. . | |
| 5,344,681 | 9/1994 | Calhoun et al. . | |
| 5,503,940 | 4/1996 | Majumdar et al. . | |

FOREIGN PATENT DOCUMENTS

| 643117 | 3/1995 | European Pat. Off. ............ 156/128.6 |
|---|---|---|

*Primary Examiner*—Geoffrey L. Knable
*Attorney, Agent, or Firm*—Henry C Young, Jr

[57] ABSTRACT

A composite of a flexible, releasable backing having discrete portions of thin, sulfur vulcanizable, carbon black filled adhesive rubber composition thereon is used for adhering a tire tread splice and other applications in assembled rubber articles. The adhesive composition comprises a rubber composition containing a sulfur curative together with carbon black, processing oil, and tackifier resin. The invention is further directed to a method of preparing a tire having tread ends joined together with said discrete adhesive composition. The adhesive is applied to the tread from its releasable backing so that tacky adhesive need not be physically contacted by an operator or machine.

9 Claims, 1 Drawing Sheet

CURABLE FILLED TREAD ADHESIVE FOR TIRES AS DISCRETE PORTIONS ON A RELEASE BACKING

FIELD

This invention relates to a composition of a releasable backing having discrete portions of a thin, sulfur vulcanizable, carbon black filled, rubber based adhesive composition thereon. The releasable backing is used for application of the adhesive composition to a rubber tire tread splice or other rubber parts. The invention also relates to a method of preparing tire treads and to a tire with tread prepared thereby.

BACKGROUND

Rubber tires are often prepared in a manufacturing process by first building a tire carcass and then building a tire tread thereover. The tire tread is conventionally applied to the tire carcass as a relatively flat, wide, sometimes somewhat contoured, uncured rubber strip which is wound around the carcass with the ends of the uncured rubber strip meeting to form a splice. Tread for retreading is often cut at a 90° angle. The ends of the rubber tread strip for a new tire are usually skived, or cut at an angle other than 90°, so that the spliced ends overlap each other. Such procedural constructions are well known to those having skill in such art.

Generally it is desired that the uncured rubber tread strip has a degree of tackiness, sometimes referred to as building tack, so that the tread splice holds together after its construction and is suitable for the subsequent tire cure step. However, the uncured tread strip often does not have sufficient natural building tack for such purpose.

Therefore, an adhesive is often applied to the faces of the opposing surfaces of the tire tread strip splice so that sufficient building tack is present and so that the tread splice can become more securely bonded. For this operation, it is common to apply a solvent based adhesive rubber composition—usually referred to as cement—to one, and sometimes both, faces of the opposing tire tread splice ends.

Examples of various cements for such purpose and tread splices joined by a rubber composition, in general, may be referred to in one or more of U.S. Pat. Nos. 3,335,041; 3,421,565; 3,342,238; 3,514,423; 4,463,120 and 4,539,365. It is readily observed that such exemplary cements are typically based on, for example, solvent solutions of compositions comprised of, for example, a base rubber, hydrocarbon oil, carbon black, tackifier resin and curative.

The tread splice adhesive needs enough cohesive and adhesive strength to hold the tread splice together using only the green tack of the adhesive until curing. Further the circumference of the tire in the tread region can increase slightly in a tire curing press putting a significant strain on the tread splice.

Due to the small adhesion area and large strain potentially applied to a tread splice, adhesives for this application have been limited to solvent based cements. The solvents increase the molecular mobility of the polymers in the adhesive and increase the wetting of the rubber substrate (e.g. tread ends). Good wetting and molecular mobility promote good adhesion to the substrate. Water based adhesives have replaced rubber cements in some less demanding applications due to their lower volatile organic emissions. Elastomeric laminates containing a solventless elastomeric adhesive such as disclosed in U.S. Pat. No. 5,503,940 have been used to adhere tread to a buffed tire carcass.

SUMMARY OF THE INVENTION

A process is disclosed for adhering a first rubber component to itself or to another, second, rubber component using at least one discrete rubber adhesive portion from a release backing. This is accomplished by 1) contacting said adhesive to a surface of said first rubber component; 2) removing said releasable backing; 3) contacting the adhesive, exposed when the releasable backing was removed, to another surface of said first rubber component or to said second rubber component, and thereby 4) forming and adhered article.

The discrete rubber adhesive is comprised of 100 parts by weight of rubber including natural rubber or at least one synthetic diene based rubber or combinations thereof, carbon black, a tackifier resin, sulfur and/or cure accelerators. The adhesive when used is desirably substantially free of volatile solvents and water. A laminate having said adhesive and said releasable backing is described.

The adhesive varies from other contact adhesives in that it has a sulfur cure system which converts the adhesive into a portion of a thermoset composition such as pneumatic tire. The environment for an adhesive in a tire is very demanding (the use temperature varies from −30° C. to 50° C.; exposure occurs to gasoline, saltwater etc.; the tire may support a vertical load of 4000 kg; and the tire travels at 60 plus miles per hour (96 km/m). The solventless adhesive in discrete form on the releasable backing differs from solvent based rubber cements in that the solvent is absent during application of the adhesive (solving volatile organic emission requirements) and the adhesive is noncontinuous in the preferred embodiments. Unless multiple adhesive applications are used only about 50 to about 99% of the area of the rubber composition to be adhered actually has adhesive present. While the discrete portions of adhesive may not cover the entire splice, during curing of the tire the tread flows and adheres to itself so the entire splice area is adhered in the vulcanized tire.

While in the most embodiments the releasable backing is removed almost immediately after it is applied, certain applications such as premanufactured treads can use the releasable adhesive backing as a releasable backing and surface protector for a adhesive surface of the tire tread. In another embodiment the discrete adhesive portions can be applied to two different rubber surfaces and then the surfaces are brought together and adhered prior to curing.

DETAILED DESCRIPTION OF THE INVENTION

Figures 1, 2:
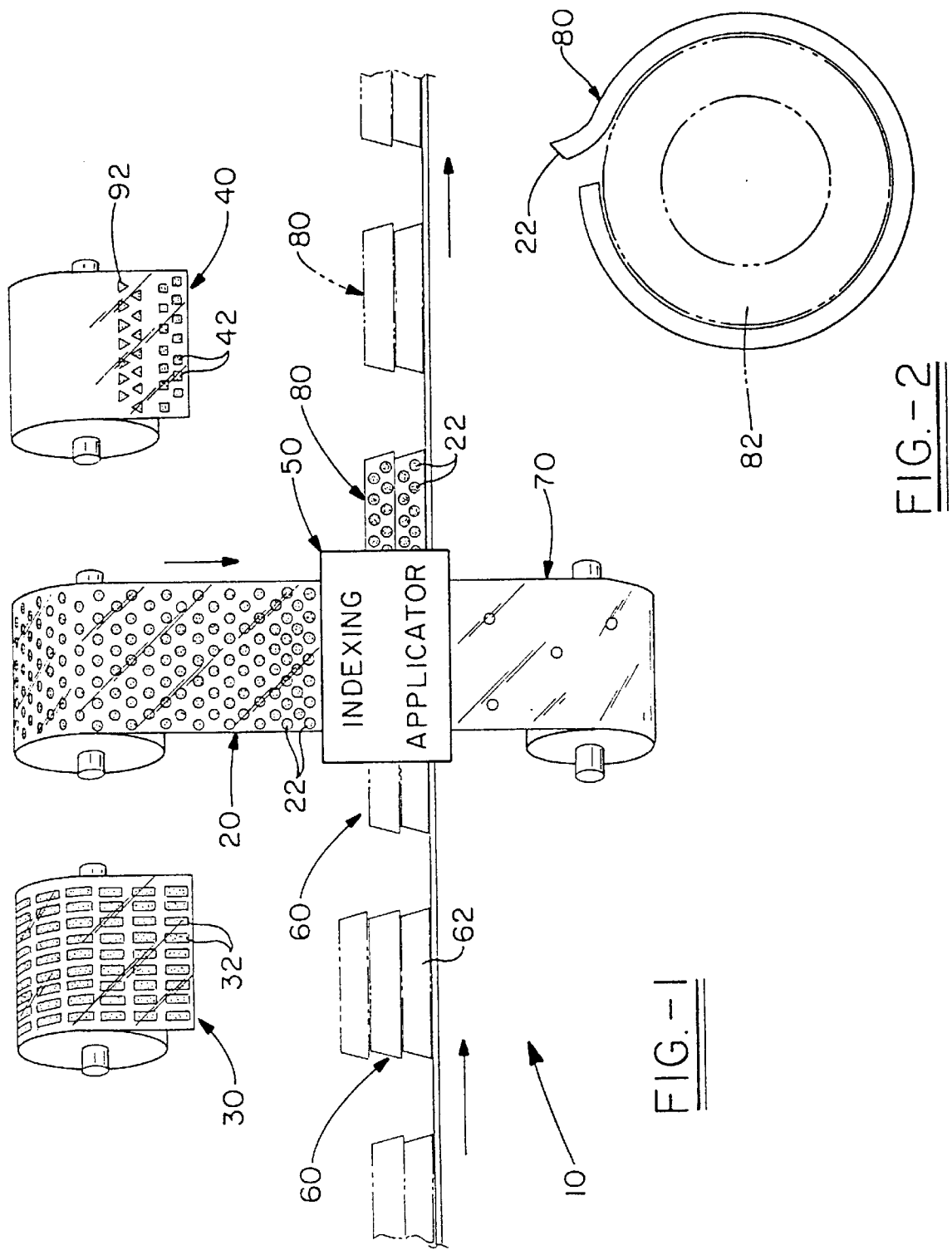
FIG. 1 illustrates a method of applying discontinuous adhesive in various patterns (22, 32, 42, and 92) from a releasable backing 70 onto tread stock 60. The tread stock with discrete adhesive thereon 62 is also shown.
FIG. 2 illustrates how the tread stock 80 with adhesive 22 interacts with the tire casing 82.

In accordance with this invention, a composite of a releasable backing having a sulfur vulcanizable, carbon black filled, adhesive rubber composition, in discrete portions thereon, where the adhesive rubber composition is comprised of (a) 100 parts by weight of rubbers including cis 1,4-polyisoprene natural rubber and/or at least one diene based rubber, preferably selected from at least one of synthetic cis 1,4-polyisoprene rubber and cis 1,4-polybutadiene rubber and styrene/butadiene copolymer rubber; (b) about 10 to about 80, preferably about 35 to about 55 phr of carbon black; (c) desirably about 4 to about 12 and preferably from about 5 to about 10 phr of rubber processing oil, optionally a tackifier resin; and (d) about 0.5 to about 3, preferably about 1 to about 2.5, phr sulfur; wherein said adhesive rubber composition desirably has a thickness of about 1 to about 50 mils (0.03 to 1.27 mm). The units of phr are parts by weight per 100 parts by weight total rubber in the composition.

It is desirable that the one or more portions of adhesive on the releasable material be substantially free of organic solvents which are readily volatile at 100° C. Desirably the adhesive is also substantially free of water. For the purpose of this specification "substantially free of" is defined as less than about 5 weight percent, more desirably less than about 3 weight percent, still more desirably less than about 2 weight percent and preferably less than 1 weight percent. Organic solvents are defined as organic compounds that would evaporate at a rate of 10 weight percent per hour when spread as a thin layer maintained at 100° C. and one atmosphere pressure. Thus, it excludes higher molecular weight materials which may be process oils in a rubber composition, but includes common organic solvents such as acetone, hexane, isopropyl alcohol, butyl alcohol, etc.

The adhesive can be prepared by casting the adhesive rubber composition as a dispersion in a volatile organic solvent as a film on a backing and drying the composition to remove the solvent, or by pressing the adhesive composition (either in a mold, by extrusion, or by calendering or combinations of pressing, extruding and/or calendering) and, thus, forming a thin strip of the adhesive composition. The adhesive composition at this time can contain solvent or be substantially free of solvent. The adhesive composition may also be derived from a water based (e.g. latex) adhesive. U.S. Pat. No. 5,395,879 discloses such a latex adhesive. The thin adhesive strip can be cut, sliced, died out or otherwise made into discrete portions on the releasable backing. If starting with a continuous film the died out portions or the trim or both can be removed to create discrete or discontinuous portions of adhesive on the same or a separate releasable backing. Adhesives of different compositions can be intermingled as discrete portions on a single releasable backing. The trim can be reworked into more film.

The temperature of the adhesive can be adjusted downward to decrease the tack of the adhesive during preparation of the laminate of adhesive and releasable backing. The equipment processing the adhesive and releasable backing can also be chosen to not adhere to the adhesive. The thickness, shape and size of the discrete adhesive portions can be further adjusted by pressing, calendering, etc. The initial film of adhesive need not be substantially free of solvent as the solvent can be removed or diminished during the process to make discrete adhesive portions.

The adhesive can be prepared by dispensing discrete portions of an adhesive onto a release backing. The dispensed adhesive can comprise solvent or be free of solvent. The discrete portions of adhesive on the releasable backing can be formed by methods such as applying dots of adhesive on the release paper. The dots of adhesive could initially include solvent with a proviso. The amount of solvents would need to be reduced such that the adhesive is substantially free of solvent before it is applied to a rubber component.

A portion or all of the releasable backing need not be flat and smooth. The release backing can have a shape (e.g. depression, cavities, and removable forms) to control the size and shape of the discrete adhesive portions. The releasable backing can be convoluted, e.g. embossed, by a variety of manufacturing techniques to form recesses which can hold discrete portions of adhesive. These types of substrates are set forth in more detail in U.S. Pat. No. 5,344,681 to Minnesota Mining and Manufacturing Company hereby incorporated by reference. Besides facilitating the preparation of discrete adhesive portions on a continuous releasable backing the recesses can also prevent cold flow of the adhesive during storage and handling.

In additional accordance with this invention, a tire is provided which is prepared by such method.

An important aspect of the invention is that the sulfur vulcanizable adhesive strip is exceptionally thin and has a thickness of only about 1 to about 50 or 200 mils. For some embodiments a thickness from about 1 to about 5 mils and preferably from about 3 to about 5 mils is desirable while in other embodiments from about 5 to about 50 or 200 mils thickness is desirable. Mils can be converted to mm by multiplying by a 0.0254 factor. One mil is 0.0254 mm and 50 mil is 1.27 mm. Casting from a volatile organic solvent onto the backing can achieve the thin adhesive strips from 1 to 10, 20 or more mils thick. Calendering of adhesive is desirable for thickness of 10 or 20 mils or more. The thinner adhesive is applied at the tire splice is desirable for new tires and uncured retreads as it minimizes the weight ratio of adhesive to tread material and results in substantially less non-tread composition in the tread region of the tire than thicker adhesive films would produce. This results in more compositional uniformity in the tread. In applications using a precured or partially precured tread, a thicker adhesive film may be desirable.

In one aspect, it is desirable for the adhesive composition to have a green tack (adhesion) value, e.g. by the positive pressure tack test, in a range of about 4 to about 12 Newtons per a 0.5 cm wide test area.

In another aspect, it is preferred that the adhesive rubber strip and such a strip in a tire having its tread strips joined by such an adhesive rubber strip, contain not more than 2, preferably less than 1 phr of a total of stearic acid, waxes, peptizers and antidegradant(s) based on paraphenylene diamine, if it contains any of such ingredients. The purpose is to reduce, or essentially eliminate any substantial blooming thereof on the exposed surface of the strip when it is a part of the splice. Blooming of components including sulfur blooming is a primary cause of loss of tack on aging.

An insoluble sulfur is preferred in some embodiments where sulfur bloom is otherwise anticipated in the adhesive composition. Conventional sulfur is considered to be of a rhombic type and insoluble sulfur is of a polymerized type. Such sulfurs are known to those having skill in the rubber art. The insoluble sulfur has less tendency to migrate through the rubber composition to its surface to appear as an unwanted bloom. Such insoluble sulfur is conventionally utilized as a mixture of the sulfur and oil, such as a rubber processing oil, for mixing with various rubber compositions. The amount of insoluble sulfur is reported herein as the weight or amount of sulfur itself and not as the blend of both sulfur and oil.

The oil used in such blend can conventionally be of the rubber processing oil type and is exclusive of and not included in the rubber processing oil component description of the adhesive composition.

Various solvents can be used to prepare an initial dispersion, or solution, of the adhesive composition which is then devolatilized before being used as an adhesive. Selection of the solvent is not considered as being a critical feature of the invention, although it is likely that some solvents will perform better than others. One example of a solvent might be, for instance, a mixture of n-heptane with methylcyclohexane and/or dimethylcyclopentane. Other solvents might be, for example, n-hexane, cyclohexane and toluene.

Various flexible releasable backing materials can be used for the composite of this invention and their selection is not considered critical so long as the backing is flexible and will suitably release from the adhesive portions. If the laminate of the adhesive portions and the backing are to be coiled for storage then the backside of the releasable backing may need release characteristics as it may be pressed against the adhesive during storage as a roll or coil. Further when uncoiling such a laminate the adhesive needs to selectively release first from the backside of the releasable backing rather than from the first release surface. Thus, it is desirable for the backing to be releasable from the adhesive. Any coating on the releasable backing is desirably non-transferable onto the uncured tread rubber as the strip is applied to the tread splice. One having skill in such art will understand the significance of such requirements.

Representative of such backing materials are, for example, polyethylene film, polypropylene film, polyester film, poly(vinyl chloride) or other release materials, such as paper or polymeric film having a silicone or wax coating thereon. It would be understood by one having skill in such art that such wax or silicone coated backing would be coated with a wax or silicone which would not transfer to the adhesive strip, or tread. It is considered herein that a transfer of a silicone polymer onto the adhesive portion would interfere with the adhesion of the adhesive to the tread splice and, thus, would not be desirable.

It is considered that the backing is needed to facilitate the preparation, handling, storage and dispensing of the adhesive. An indexing machine/applicator could advance the releasable backing exposing and applying the adhesive to the desired substrate. The application of the discrete portions of adhesive could thus be automated such that, as fresh treads approached the equipment to supply the adhesive, the releasable backing is appropriately advance to apply fresh adhesive in a predetermined manner to one or both tread ends. Alternatively the indexing machine/applicator could apply the adhesive to other rubber components of a tire. The releasable backing could then be collected and recycled.

In the practice of this invention a variety of crosslinkable rubbers can be used. Examples include natural rubber and at least one synthetic polymer polymerized from one or more conjugated dienes having from 4 to 7 carbon atoms or combinations of natural rubber and at least one synthetic polymer. Desirably the synthetic polymers comprise at least 30, more desirably at least 50, and preferably at least 60 weight percent repeat units from said conjugated dienes. A blend of at least two of the said rubbers is preferred and a blend of at least three of the cis 1,4-polyisoprene, cis 1,4-polybutadiene and styrene/butadiene copolymer rubbers is more preferred in order to provide an adhesive with suitable compatibility with a wide range of conventional sulfur curable tire tread rubber compositions while presenting suitable cured strength and elongation coupled with an uncured tack (when combined with the remainder of the ingredients) and processing characteristics. In practice, the cis 1,4-polyisoprene rubber is preferably natural rubber.

The styrene/butadiene copolymer rubber, if used, is utilized to compatibilize the adhesive to a rubber substrate. However, it is considered herein that, in general, the copolymer rubber tends to reduce the tack of the resultant strip of the cement composition and, therefore, is intended, or preferred, to be utilized only in a minimal amounts, e.g. in amounts of 10 phr or less, if it is used at all.

Desirably carbon black and/or silica is used to provide reinforcement of the rubber of the adhesive. Desirably the silica or carbon black or both if present is from about 5 to about 100 phr, more desirably from about 20 to about 70 phr and preferably about 40 to about 50 phr. The high carbon black loading in the strip is used to provided rubber reinforcement and promote high cured strength. Otherwise the splice of the tire may separate during services. Preferred carbon black for the tread splice is the high abrasion furnace, super abrasion furnace, and the intermediate super abrasion furnace black. Where abrasion resistance is not a concern and heat build up is a concern, such as in the internal components of a tire, less reinforcing carbon black grades such as fast extruding furnace and larger diameter carbon black particles are desirable. Desirably the amount of carbon black is from about 10 to about 80 phr and more desirably from about 35 to about 55 phr. Desirably the carbon black has a surface area by CTB, D3037 of from about 7 to about 26 $m^2/g$. If utilized, any conventional elastomer reinforcing carbon black is suitable and the average mean particle diameter thereof is 285 nm or less, and preferably 60 nm or less as in grades N550, N330, and the like (ASTM-D-3849).

In some embodiments the adhesive composition may use of silica as a reinforcing agent in an amount of from about 15 or 25 to about 70 or 80 or desirably from about 40 to about 60 parts by weight per 100 parts by weight of rubber (phr) and use reduced amounts of carbon black. This has been found to reduce heat buildup in some tire applications. The mean BET surface area of the silica may be generally from about 20 to about 500 $m^2/g$ and preferably from about 60 to about 300 $m^2/g$. Various types of reinforcing silica can be utilized including fumed silica, precipitated silica, hydrated silica, and the like with precipitated silica being preferred. Reduced amounts of carbon black will be defines as 25 parts by weight or less, 20 or less, desirably 15 or less, 10 or less, 5 or less, and preferably nil, i.e., no carbon black at all, parts by weight per 100 parts by weight of rubber.

A coupling agent can be utilized with silica which effectively bonds (i.e., chemically bonds) the silica reinforcing agent to the rubber. A suitable coupling agent are the various sulfur containing alkylene alkoxy silanes having from 2 to 6 sulfur atoms; and from 1 to 3, usually 2, silicon atoms; and wherein the one or more alkylene groups generally each have from 1 to 6 carbon atoms, and desirably from 1 to 4 carbon atoms. The number of alkoxy groups is from 1 to 9, usually 6, when the silane contains 2 silicone atoms, and each alkoxy group has from 1 to 4 carbon atoms with 1 or 2 carbon atoms being preferred. Examples of such silane coupling agents include, for example, bis-(3-[trialkoxysilyl]alkyl)polysulfide, (γ-mercaptopropyl)trimethoxysilane, and (γ-mercaptopropyl)triethoxysilane. The amount of the sulfur containing alkylene alkoxy silane compounds of the present invention is generally from about 0.01 to about 0.2 part by weight per part by weight of silica. A preferred coupling agent has the formula

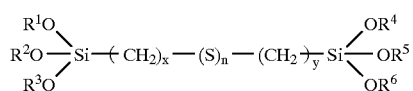

wherein n is from 2 to 6 and preferably about 4, wherein x and y independently are 1 to 4 with 3 being preferred and $R^1$, $R^2$, $R^3$, $R^4$, $R^5$, and $R^6$, independently, is an alkyl having from 1 to 4 carbon atoms with methyl or ethyl being preferred. A specific example of a preferred coupling agent is Si69 as bis-4(3-[triethoxysilyl)]-propyl)tetrasulfide from Degussa, and provided as a 50/50 percent blend by weight thereof with an HAF carbon black. The sulfur containing alkylene oxide silane is often mixed with carbon black to improve mixing and ease of handling.

The rubber processing oil is used to reduce the viscosity thus improving processability.

The rubber processing oil can be aromatic and/or paraffinic. Substituting a low molecular weight liquid polyisoprene for some of the high molecular weight rubber may also improve processability.

Desirably a tackifier resin is used in the adhesive in amounts effective to impart adhesion to both unvulcanized and vulcanized rubber substrates. Common tackifiers for this purpose are set forth in U.S. Pat. No. 5,503,940 hereby incorporated by reference. Desirably the amount of tackifier resin is from about 1 to about 30 or 40 phr. The non-reactive phenol-formaldehyde resin tackifier is used to add tack to the adhesive composition. It is used in a relatively small amount to add tack while maintaining processability and ease of handling and application. In one aspect, non-reactive phenol-formaldehyde resin utilization can be reduced by using a relatively high level, or amount, of the rosin oil and a relatively low level, or amount, of the resin.

In the practice of this invention, it is understood that suitable rubber compounding ingredients can be added to the composition including antidegradants, pigments, zinc oxide, stearic acid, zinc stearate and cure accelerators.

The solventless adhesive composition in some embodiments may include a mixture of at least one elastomer, at least one tackifier, and at least one bis-imide compound of the general formula:

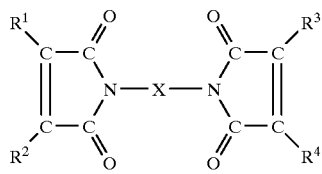

where $R^1$, $R^2$, $R^3$, and $R^4$, independently, are hydrogen, an alkyl group having from 1 to 5 carbon atoms, a phenyl group, an alkylphenyl group or groups having 7 to 20 carbon atoms or a halogen substituted alkyl group having from 1 to 5 carbon atoms, a halogen substituted phenyl group, or a halogen substituted alkylphenyl group having a total of from 7 to 20 carbon atoms, and where X is an alkylene group having from 1 to 5 carbon atoms, a phenylene group, an alkylphenylene or alkylenephenyl group or groups having 7 to 20 carbon atoms or a halogen substituted alkylene having from 1 to 5 carbon atoms, a halogen substituted phenylene group, or a halogen substituted alkylphenylene or alkylenephenyl group having a total of from 7 to 20 carbon atoms.

Examples of a bis-imides are N,N'-m-xylylene bis-citraconic imide (Perkalink® 900 manufactured by Flexsys), wherein $R^1$, $R^2$, $R^3$ and $R^4$ are $CH_3$ and X is $CH_2$—$C_6H_4$—$CH_2$; N,N'-m-phenylene bismaleimide (HVA-2 200 manufactured by DuPont), wherein $R^1$, $R^2$, $R^3$ and $R^4$ are hydrogen and X is $C_6H_4$; and wherein $R^1$, $R^2$, $R^3$ and $R^4$ are hydrogen and X is $CH_2$—$C_6H_4$—$CH_2$—$C_6H_4$. U.S. Pat. No. 5,503,904 herein incorporated by reference for its teachings on bismaleimides and it illustrates the benefits of this compound in reducing heat buildup.

In the practice of this invention, the adhesive can be applied by suitable means from its flexible backing such as by application of the adhesive alone to the substrate or by the application of both the adhesive and releasable backing, optionally tearing, fracturing, or cutting the releasable backing, and then removing the backing before bonding to the second substrate. In this type of application the releasable backing may function both as a releasable backing and as a protectorant for the clean rubber and adhesive surfaces until the rubber is adhered during manufacturing to other rubber components (e.g. the tire casing). When the adhesive alone is applied to a substrate, the adhesive is pressed onto the substrate by the backing and then the backing is removed from the adhesive. When the backing is not torn, fractured, or cut it is more easily mechanically collected for recycling.

In further accordance with this invention, a method of preparing a pneumatic rubber tire is provided which comprises building an outer unvulcanized rubber carcass, joining the ends of said tread strip with the unvulcanized adhesive rubber portions from a releasable backing of this invention and vulcanizing the resulting assembly under conditions of heat and pressure; wherein, prior to the vulcanization step, said unvulcanized adhesive rubber portions have been applied to at least one tread strip end (optionally both ends) from a releasable flexible backing. The flexible backing is removed from the adhesive rubber portions and the tread strip ends pressed together with said adhesive rubber portions therebetween prior to said vulcanization step. The adhesive of this disclosure may also be used to adhere the tread (cured or uncured) to a tire casing or to secure any tire component to another tire component.

Thus, a pneumatic rubber tire is provided having an outer, sulfur cured rubber tread in the form of circumferential rubber strip with its ends joined and adhered together through the sulfur cured adhesive rubber composition of this invention.

In one aspect, a pneumatic rubber tire is prepared by building an outer unvulcanized rubber carcass, joining the ends of the said unvulcanized tread strip with one or more discrete portions, more desirably three or more portions of the unvulcanized adhesive rubber composition of this invention and vulcanizing the resulting assembly under conditions of heat and pressure.

It is to be appreciated that the preparation of the tire carcass, application or building of the tread onto the carcass and the vulcanizing, or curing, of the assembly in a suitable mold under conditions of pressure and elevated temperature are well known to those having skill in such art.

The discrete portions of adhesive on a releasable backing have utility to form new and retreaded pneumatic tires, including those for passenger vehicles, trucks, and aircrafts. The following examples are provided which are intended to be illustrative in nature and the parts and percentages by weight unless otherwise indicated.

EXAMPLES

The following adhesives were prepared to illustrate how the discrete adhesive portions could be prepared and the physical properties that may be expected.

TABLE I

Adhesive Compositions

| Adhesive | 1 | 2 | 3 | 4 |
|---|---|---|---|---|
| Natural Rubber | 75 phr | 75 | 75 | 40 |
| Polybutadiene | — | — | — | 60 |
| Synthetic High cis Poly-isoprene | 25 | 25 | 25 | — |
| Phenol-Formaldehyde Resin Tackifier | 2 | 2 | 2 | 7.5 |
| N660 Carbon Black | 35 | — | — | — |
| N299 Carbon Black | — | 35 | 50 | — |
| N550 Carbon Black | — | — | — | 50 |
| Stabilizers | 2 | 2 | 2 | 3.3 |
| ZnO | 4 | 4 | 4 | 3.5 |
| Curatives* | 3.15 | 3.15 | 3.15 | 3.61 |
| Peptizer | 0.25 | 0.25 | 0.25 | — |
| Napthenic/Paraffinic Medium Process Oils | 2 | 2 | 2 | 5.8 |
| Rosin Oil | — | — | — | 1.3 |

*Curatives are sulfur and accelerators.

Strips Preparation 22 mil (0.56 mm) strip: About 25 g of adhesive composition material from those shown in Table I was pressed between two mylar sheets inside a 6"×6"×0.022" (152×152×0.56 mm) mold for 5 minutes at 32 tons pressure (29,030 kg). The 22 mil strips were prepared from adhesives 1–4 and labeled as adhesives 1a, 2a, 3a, and 4a.

75 mil (1.9 mm) strip: About 80 g of material from Table I was pressed between two release liners inside a mold of dimensions 6"×6"×0.75" (152×152×1.9 mm) for 5 minutes at 121° C. at 29,030 kg pressure. A 75 mil strip from adhesive 4 was prepared in this manner and labeled 4b.

Discrete Tape Preparation

By Method I: Adhesive strips of dimensions 12.7×127×0.56 mm were cut from the 152×152×0.56 mm strip (1a, 2a, 3a, 4a). Adhesive strips were placed between two release liners as a discrete adhesive transfer tape separated by 64 mm. The strips were pressed further at 121° C. for 5 minutes at 29,030 kg. Final thickness of the discrete adhesives (labeled 1C, 2C, 3C and 4C) layers were as follows:

| ADHESIVE | THICKNESS |
|---|---|
| 1C | 0.15 mm (6 mil) |
| 2C | 0.20 mm (8 mil) |
| 3C | 0.15 mm (6 mil) |
| 4C | 0.18 mm (7 mil) |

By Method II: A 50.8×152×1.91 mm strip of adhesive 4b was cut from the 152×152×1.9 mm strip. The 50.8×152×1.91 mm strip was cooled with Dry Ice and then cut into several 50.8×152×0.25 mm strips with the help of Fortuna SAS cutter from Hudson Machinery. When the 0.25 mm (10 mil) thick strips were pressed for 5 minutes at 121° C. at 29,030 kg pressure, then adhesive transfer tapes (labeled 4d) as thin as 0.05 mm (2 mil) were obtained.

Positive Pressure Tack Measurements

A light truck tread compound containing 70 phr solution SBR, 20 phr polybutadiene and 10 phr natural rubber was obtained from a tire plant. Positive pressure tack test pieces were prepared from this tread compound. The test was modified in that thin adhesives were sandwiched between two test pieces (freshly removed poly cover sheet) and positive pressure tack values with adhesive were determined. These values are reported in Table II.

The tack measurements were obtained in accordance with the following TACK Test. The TACK Test measures the interfacial tack of two green samples of stock after having been compressed together with a known force.

In general, uncured rubber compound is calendered and test samples are built from two uncured compounds as sheets with an intervening precut Mylar™ sheet having five evenly-spaced 5 mm wide windows. One end of these windows are sloped 45° to a point. The samples are pressed together by an automated apparatus for 30 seconds at 25° C.±2° C. at 0.21 MPa (2 atmospheres) of pressure. The calendered sample is then cut with a specimen die so that five samples each having a longitudinal 5 mm wide window of adhesion are ready to be pulled apart on a force displacement tester or equivalent with pneumatic jaws, such as is available from Instron.

More specifically enough of the rubber compound was calendered to obtain one 152.4 mm×304.8 mm×1.27 mm sheet per sample. The sample was tested within 24 hours of calendering, unless aged tack was desired. A piece of masking tape that was 152.4 mm in length was applied along the grain of the calendered stock. The tape was stitched with a 50.8 mm roller or the equivalent using minimum pressure.

Two samples were cut from the calendered sheet using a specimen die. Each sample was 73.0 mm×148.2 mm. The exposed surface was not touched. Two precut 5.0 mm Mylar™ sheets were placed on the exposed side of one of the samples. Then the other sample was placed on top of the sheet. The two exposed sides of the samples faced each other with the Mylar™ sheets in between. The sample was placed in Arbor Press with a top and bottom pressure plate. A pressure of 0.21 MPa (2 atmospheres) was applied.

The sample was removed from the press and centered under a 25.4 mm×88.9 mm cutting die assembly that was attached to a second Arbor press. Enough pressure was applied to cut through the sample which yielded five specimens.

The rest of the test was conducted at room temperature (i.e. 25° C.±1° C. and 55 percent relative humidity). The force displacement tester had the following settings: crosshead speed at 127 mm/min, 25 Newtons for full scale and chart speed at 127 mm/min. The end tabs of one specimen were spread, and it was insured that the only adhesion taking place was under the Mylar™ window. The end tabs were clamped in the upper and lower jaws of the tester. The chart was turned on, and the crosshead was engaged. These steps were performed for each of the other four specimens. The chart showed the steady state values of the force to pull the sample apart in the Newtons. The tack values shown in the Table herein are the average steady state values for each sample.

Steady state values per 0.5 cm width window were measured and reported in Tables II and IV. The adhesive was in discrete form on the releasable backing but a single adhesive portion was large enough to cover the entire splice (adhered area) in Table II. In Table IV the adhesive was in discrete portions on the splice.

Hot Cured Adhesion Measurements

Cured adhesion was measured as follows: Light truck tread compound as described before was prepared as sheets. Test pieces were prepared from these sheets with an intervening Mylar™ sheet with windows therein as described in the positive pressure tack test. The test was modified in that thin adhesives were sandwiched between two test sheets. The samples (two sheets, Mylar™, and adhesive(s)) were cured for 28 minutes at 150° C. and 0.69 MPa pressure (100 pounds per square inch) and then cured adhesion were measured at 95° C. Detailed test results are also shown in Table 1.

The cured adhesion, which determines the interfacial adhesion between compounds, was measured using the adhesion test detailed below at 95° C.

The materials required for the test include a force displacement tester with oven or equivalent available from Instron, Inc., a clicker die that is 149×149 mm (5.875×5.875 in) for cutting uncured compound, a 51-mm wide roller for stitching compound to fabric backing, a Gang die having six 25 mm (1 in.) cavities for cutting the cured test specimens, diaphragm curing molds for curing test blocks, cord reinforced rubber backing having a gauge of 1.0 to 1.27 mm (0.40 to 0.50 in.), Mylar™ sheets containing four evenly spaced 5-mm wide by 100-mm long windows, and tread stock.

Mylar™ protecting sheets were removed from one side of each sheet of tread stock, and fabric backing was applied to the sample. The cord direction was parallel to the sample mill grain. the sample was stitched with a 51-mm (2 in.) wide roller. Uncured samples 150×150×2.4 mm (5.875× 5.875×0.95 in.) were cut from each sample to be tested. The cord fabric backing was parallel to the grain direction.

The press was set for an air line pressure of 0.671 MPa (100 psi), and the cure time (28 minutes) was set. The sample was placed in the bottom cavities of the preheated (150° C.) diaphragm curing mold. The samples were covered with a sheet of cellophane, and the curing bladder was put on top of the cellophane. The top plate was put on top of the cellophane. The top plate was put on top of the curing bladder and put in the curing press.

The sample was cured and the mold was removed from the press. The top plate, cellophane and bladder were also removed. The samples were removed from the mold cavities and allowed to cool at room temperature.

Four 25-mm wide test strips were cut out of the sample so that the Mylar™ window was as near to the middle of the test sample as possible. The sample was pulled apart at the open end, and the Mylar™ was cut off. The tab ends were inserted into the grips of the testing machine. The samples were tested at 51 mm/min., and the samples were conditioned in the oven for 15 minutes at about 95° C. The cured adhesion is the force required to pull the. 0.5 cm wide adhered portion of the sample apart, and the steady state average load in Newtons is reported in Tables.

TABLE II

Positive Pressure Tack (PPT) and Hot Cured Adhesion (HCA) for Adhesive between Two Light Truck Tread Compounds

| ADHESIVE | THICK-NESS | PPT, NEWTONS | HCA, NEWTONS (TEAR) |
|---|---|---|---|
| NONE | | 2.3 | 77 (KNOTTY) |
| M-9451* CEMENT (CONTROL) | | 5.8 | 57 (KNOTTY) |
| 1C (IN DISCRETE FORM ON BACKING) | 0.15 mm | 6.0 | 122 (KNOTTY) |
| 2C (IN DISCRETE FORM ON BACKING) | 0.20 mm | 5.0 | 86 (KNOTTY) |

TABLE II-continued

Positive Pressure Tack (PPT) and Hot Cured Adhesion (HCA) for Adhesive between Two Light Truck Tread Compounds

| ADHESIVE | THICK-NESS | PPT, NEWTONS | HCA, NEWTONS (TEAR) |
|---|---|---|---|
| 3C (IN DISCRETE FORM ON BACKING) | 0.15 mm | 7.9 | 102 (KNOTTY) |
| 4C (IN DISCRETE FORM ON BACKING) | 0.18 mm | 7.6 | 48 (KNOTTY) |

*M-9451 is a commercial available tread splice cement available from Akron Paint and Varnish, Akron, Ohio.

Table II shows the positive pressure tack and hot cured adhesion values when discrete adhesive portions on transfer tape (backing) was used. Previous correlation of positive pressure tack values to splice closing behavior has indicated that 4.5 Newtons can satisfactorily close the tread splice. All the four adhesive tested has acceptable positive pressure tack values i.e. higher than 4.5 Newtons.

Table II also shows that the cured adhesion with adhesive 1C, 2C, and 3C are respectively 122, 86 and 102 Newtons and are higher than the M-9451 cement control (57 Newtons). The cured adhesion is 16% lower than control cement when adhesive 4C was utilized indicating some effect of adhesive composition on cured adhesion. These results show that substantially solvent free discrete adhesive transfer tape can produce satisfactory green tack and cured adhesion.

An additional adhesive recipe (given in Table III below) as tested as discrete adhesive portions. A control cement 9451 which is a solvent base cement was ran to illustrate that the solvent-free adhesive has similar adhesion to commercially available solvent based cements for tire applications.

TABLE III

| Adhesive | 5 |
|---|---|
| Natutal Rubber | 40 phr |
| Synthetic Isoprene Rubber | 10 |
| Styrene Butadiene Rubber | 14 |
| Butadiene Rubber (high cis) | 36 |
| Carbon Biack | 35 |
| Antioxidant and Antiozonant | 3.37 |
| Oil | — |
| Phenol Formaldehyde Resin | — |
| Stearic Acid | 2.0 |
| Zinc Oxide | 3.5 |
| Waxes | — |
| Hydrocarbon Resin* | 13.86 |
| Silica | 10 |
| Silica Coupler** | 2 |
| Curing Agents*** | 2.53 |

*Hydrocarbon, resin was Promix 400 ™ available, from Flow Polymers, Inc. in Cleveland.
**Silica Coupler was obtained as a blend of Si69 and carbon black in a 50/50 weight ratio and obtainable from Degussa S. A.
***Curing, agents were sulfur and accelerators.

A tread compound including 70 phr of solution polymerized styrene-butadiene rubber, 20 phr of polybutadiene, and 10 phr of natural rubber, was obtained from a tire plant. Samples were adhered with the adhesives from Tables I and III and the positive pressure tack (PPT) and hot cured adhesion (HCA) were measured.

TABLE IV

| Adhesive | Form on Test Piece | Thickness | PPT Newtons | HCA (Tear) Newtons |
|---|---|---|---|---|
| Adhesive 5 | Continuous | 22 mil | 12.4 | 112 (KNOTTY) |
| Control Cement 9451 (solvent) | Applied with a brush | | 5.8 | 57 (KNOTTY) |
| Adhesive 4 | 0.5 cm strips separated by 0 4 cm | 20 | 8.3 | 73 (KNOTTY) |
| Adhesive 5 | 0.5 cm strips separated by 0.4 cm | 20 | nd | 143 (KNOTTY) |
| Adhesive 5 | 1 cm diameter spots every 2 cm | 2 | 5.3 | 137 (KNOTTY) | nd = not determined

While in accordance with the patent statutes the best mode and preferred embodiment has been set forth, the scope of the invention is not limited thereto, but rather by the scope of the attached claims.

What is claimed is:

1. A process for adhering the opposite ends of a tire tread in a tire building or tire retreading operation, comprising:
   a) providing an uncured tire carcass or a cured tire carcass;
   b) positioning the tread strip around the uncured or cured tire carcass,
   c) optionally trimming the tread strip to provide a better splice;
   d) applying discontinuous portions of adhesive from a release material to at least one end of said tire tread by adhesively pressing the tire tread against said discontinuous portions of adhesive which is slightly adhered to a release material and thereafter removing said release material from said discontinuous portions of adhesive;
   e) thereafter adhesively joining the two opposite ends of said tread strip with said adhesive;
   wherein said adhesive comprises:
   1) rubber including natural rubber and/or a synthetic diene based rubber;
   2) carbon black;
   3) tackifier resin; and
   4) a vulcanizing agent and wherein said adhesive is substantially free of volatile organic solvents and water.

2. A process according to claim 1, wherein said discontinuous portions of adhesive applied to said tire tread comprises at least three discontinuous portions of adhesive.

3. A process according to claim 2, wherein said adhesive comprises a bis-imide compound of the formula

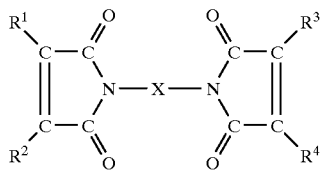

where $R^1$, $R^2$, $R^3$, and $R^4$, independently, are hydrogen, an alkyl group having from 1 to 5 carbon atoms, a phenyl group, an alkylphenyl group having 7 to 20 carbon atoms or a halogen substituted alkyl group having from 1 to 5 carbon atoms, a halogen substituted phenyl group, or a halogen substituted alkylphenyl group having a total of from 7 to 20 carbon atoms, and where X is an alkylene group having from 1 to 5 carbon atoms, a phenylene group, an alkylphenylene or alkylenephenyl group or groups having 7 to 20 carbon atoms or a halogen substituted alkylene having from 1 to 5 carbon atoms, a halogen substituted phenylene group, or a halogen substituted alkylphenylene or alkylenephenyl group or groups having a total of from 7 to 20 carbon atoms.

4. A process according to claim 2, wherein said adhesive comprises a silica and a silane coupling agent.

5. A process according to claim 2, further comprising vulcanizing said at least three portions of adhesive while said adhesive is joining said two opposite ends of said tread strip.

6. A process according to claim 5, wherein said vulcanizing agent is sulfur or a sulfur containing accelerator.

7. A process according to claim 6, wherein said release film is part of a continuous roll of release film with discontinuous adhesive and is mechanically advanced to expose new adhesive to repeat said process.

8. A process according to claim 6, wherein said carbon black is present in amounts from about 10 to about 80 phr.

9. A process according to claim 8, wherein said carbon black is a high abrasion furnace, super abrasion furnace, or intermediate abrasion furnace or combinations thereof.

* * * * *